United States Patent [19]

Fraden et al.

[11] Patent Number: 5,795,067
[45] Date of Patent: Aug. 18, 1998

[54] ENHANCED PROTECTIVE LENS COVER FOR AN INFRARED THERMOMETER

[75] Inventors: Jacob Fraden, San Diego; Joseph P. Brown, Valley Ctr.; Robert P. Lackey, Carlsbad, all of Calif.; Randall R. Howe, Eaton, Colo.; Heinz Bultges, Eppstein, Germany; Wolfram Debus, Kronberg, Germany; Gunther Bautz, Ulm, Germany; Helmut Franke, Wehrheim, Germany

[73] Assignee: Thermoscan, Inc., San Diego, Calif.

[21] Appl. No.: 643,841

[22] Filed: May 7, 1996

[51] Int. Cl.[6] .............. G01K 1/08; A61B 5/00; A61B 6/00; A61B 1/227
[52] U.S. Cl. .............. 374/158; 128/664; 600/186; 600/200
[58] Field of Search ............ 374/158, 209; 128/664, 736; 206/306; 600/200, 203, 184, 186

[56] References Cited

U.S. PATENT DOCUMENTS

| | | |
|---|---|---|
| 4,662,360 | 5/1987 | O'Hara et al. ............ 374/158 |
| 4,911,559 | 3/1990 | Meyst et al. ............ 374/158 |
| 5,018,872 | 5/1991 | Suszynski et al. ............ 374/158 |
| 5,088,834 | 2/1992 | Howe et al. ............ 128/664 |
| 5,163,418 | 11/1992 | Fraden et al. ............ 374/158 |
| 5,293,862 | 3/1994 | O'Hara et al. ............ 374/158 |
| 5,318,029 | 6/1994 | Palese ............ 374/209 |

FOREIGN PATENT DOCUMENTS 406043037  2/1994  Japan ................. 374/158

Primary Examiner—Diego F.F. Gutierrez
Attorney, Agent, or Firm—Hopgood, Calimafde, Kalil & Judlowe

[57] ABSTRACT

A disposable cover for an infrared thermometer provides IR window isolation of handling and usage generated forces. The cover comprises a thin sidewall linked to the film window with a collar structure. The collar structure includes one or more characteristics that either isolate the film window from externally applied forces, or develops counter forces in a way that precludes film stretching and other transmission distorting effects. The cover of the present invention permits sanitary application of an infrared clinical thermometer without hindering reading accuracy or patient comfort.

25 Claims, 4 Drawing Sheets

ENHANCED PROTECTIVE LENS COVER FOR AN INFRARED THERMOMETER

FIELD OF THE INVENTION

The present invention relates generally to protective covers for infrared sensor systems. In particular, the present invention relates to an enhanced protective cover design that permits passage of infrared radiation with a minimum a of distortion while insuring sanitary protection of an infrared clinical thermometer.

BACKGROUND OF THE INVENTION

Accurate temperature measurement has long been an objective of researchers in a variety of fields. Temperature sensing of patients is of particularly acute concern in the health care field due to the high correlation between patient health and body temperature. Indeed, a significant aggregate expenditure in support of medical care is dedicated to the accurate assessment of body temperature—in hospitals, clinics, nursing homes, doctor' offices and, of growing importance, at home. Invariably, one of the first things sought during a visit to a doctor or hospital is the patient' body temperature. As such, patient temperature assessment is a large and important expenditure in providing suitable health care.

Past patient temperature measurement systems have migrated from slow mercury thermometers (oral and rectal) to electronic contact sensors (predictive thermometers using resistive contact elements) to more recent non-contact systems based on infrared ("IR") sensing. A particularly successful clinical thermometer corresponds to U.S. Pat. No. Re: 34,789 to Fraden (the "Fraden IR Thermometer") the contents of which are incorporated by reference as if restated in full. The Fraden design utilizes a highly sensitive infrared detector engineered with a specific optic system to permit accurate assessment of radiation from the tympanic membrane of a patient' ear. The sensed radiation is converted to a temperature reading having an impressive correlation to actual patient temperature. Importantly, the above design permits accurate temperature measurement in 1-2 seconds with minimal patient discomfort.

Clinical practice mandates a sanitary environment for the patients and instruments. Disposable sanitary protective covers have become an ubiquitous commodity in patient care, minimizing the spread of infectious agents and cross-contamination of patients under care in a common area. The needs for sanitary practice also exist in the use of IR thermometers. Accurate temperature measurement with an IR thermometer requires the controlled placement of the sensor probe into the patient' ear canal for proper alignment between the IR sensor and the tympanic membrane of the ear. The ear canal is not a likely source of germs or other contaminants—however, medical care mandates the reduction of risk of cross contamination whenever possible. Additionally, the optics of an infrared thermometer must remain free and clear of ear wax. In view of the foregoing concerns, use of the minimally intrusive infrared thermometers of the Fraden type is advantageously implemented with a sanitary barrier precluding contact between the sensor and the patient' ear.

Sanitary barriers for clinical thermometers are not new. Indeed, many older clinical thermometers based on contacting mucous membranes for sensing temperature required the use of a disposable cover as a sanitary barrier, which was discarded after each use. Early sanitary cover designs were quite simple in concept. The basic structure applied a rigid wall for handling purposes combined with a thin film contiguous with the contact sensor element. The film was thin and often stretched to minimize the thermal barrier to conductive heat transfer. Exemplary early cover structures are depicted in U.S. Pat. No. 3,822,593 to Oudawaal and U.S. Pat. No. 3,987,899 to Vyprachticky. These early covers were routinely made from inexpensive plastics such as polyethylene and polypropylene and either injected molded as one unitary structure or formed in two parts—bonding a thin film onto the more rigid body portion. Either way, the resulting cover would be attached to the sensor and then the combined structure placed, e.g., in the patient' mouth to obtain the temperature reading. After the reading, the cover is detached and discarded.

Early infrared thermometers also employed disposable covers. These early disposable covers for infrared thermometers originally were closely modeled on the above-described covers for contact thermometers. For example, U.S. Pat. Nos. 5,293,862 and 5,179,936 to O'Hara, et al. disclose a two-piece cover design wherein a thin transparent film is bonded to a rigid tubular body forming a disposable cover for an infrared thermometer. The manufacturing process of this cover design causes the formation of wrinkles in the thin transparent film. Film wrinkles of this nature may interfere with infrared transmission between the tympanic membrane of the ear and the IR sensor of the thermometer. Accordingly, the use of this probe cover design required the removal of these wrinkles by stretching the film over the infrared sensor.

However, stretching the film to remove wrinkles may create other sources of potential measurement inaccuracies. Firstly, a film that is stretched may stretch in a non-uniform manner creating a "lensing" effect that may distort transmitted infrared radiation. Secondly, the stretched film may result in a realignment of the polymer molecular structure causing variations in both the reflective and absorptive properties of the film. Accordingly, such prior art infrared probe covers that require stretching to remove wrinkles or other undesirable surface characteristics in the film window of the disposable cover may possess somewhat unpredictable transmission properties when fitted onto a probe of an infrared thermometer.

Similarly, U.S. Pat. No. 4,911,559 issued to Meist and Suszinski discloses an infrared probe cover susceptible to the effects of stretching of the film. The Meist and Suszinski patent teaches a laminated probe cover where the polymer film significantly stretches when being fitted over an infrared thermometer probe. The effects caused by this stretching of the film invariably affects the transmissivity of the film in unpredictable ways that may result in errors in temperature measurement.

Other problems have arisen with past designs of probe covers for infrared sensors. For example, prior art infrared probe covers were often configured so that the film would contact the patient' skin. The patient' skin—if at a different temperature than that of the probe cover—will cause a temperature gradient to form in the film as heat conduction triggers an energy flow from the warmer ear to the cooler film. The resulting elevated temperature of the film amplifies an error source known as secondary radiation. Secondary radiation refers to the infrared radiation that the cover emits relative to the infrared radiation emitted by the primary source, viz., the tympanic membrane of the ear. It has been found that it is important to minimize the fluctuations of secondary radiation from all sources including that of the cover film window. Secondary radiation triggered by unpredictable heat flows from the ear canal to the film window may induce measurement inaccuracies in the clinical thermometer.

An additional source of measurement error resides in the departure from good optical alignment that characterized earlier cover designs. For example, the prior art covers with non-uniform film windows (caused by either the manufacturing process or subsequent stretching) are haphazardly placed on the sensor with no ability to control the alignment of the film window relative to the sensor—target optical axis. Consequently, if the probe cover is not properly aligned or centered, the transmission of infrared radiation may be affected due to variations in the film.

Experience in clinical thermometer use has shown that it may be desirable to increase the angle of view of an infrared sensor. It is believed that the enhanced angle of view compensates for directional errors that may arise if the clinical thermometer is not properly inserted in the ear canal for a measurement, i.e., the sensor is not properly aligned with the tympanic membrane as incorrectly aimed. Probe cover designs that excessively limit the field of view of the IR sensor may become an impediment to proper temperature assessment.

As can be seen from the above discussion, the design of infrared transmissive disposable covers is a complex and difficult task. The recognition of the need for a fully functional sensor cover design and the inherent problems of the prior art have led to the present invention.

SUMMARY OF THE INVENTION

Accordingly, it is an object of the present invention to provide a probe cover design that eliminates the stretching of the film window portion of the probe cover so that stretched induced distortions are removed as a source of measurement errors in clinical temperature measurement.

It is another object of this invention to minimize the thermal effects which result from contacting the probe cover with the skin surface of a patient.

Another object of this invention is to provide a self-aligning probe cover which would ensure consistent placement and optical alignment of the probe cover onto the thermometer probe.

Still another object of this invention is to provide a probe cover which enhances the field of view of the infrared thermometer, thereby minimizing errors in the placement of the thermometer probe within the ear canal.

The above and other objects of the present invention are realized in a protective cover design that includes a window portion having a pre-engineered set of IR transmission characteristics that eliminate the need to stretch the film window or otherwise manipulate the film window after manufacture. As with prior art protective covers, the inventive cover includes a side wall section that is designed to engage the thermometer probe section and position the transparent film window in front of the sensor. The preferred shape is a short truncated cone or tubular structure open at a first end and closed with the film window positioned at a second and opposing end of the tubular body. The open end is dimensioned and adapted so that it interfaces with the probe tip of the thermometer to releasably hold the cover in an automatically centered position in relation to the probe sensor.

The IR transmissive film is preferably a circular window with a circumferential strain relief collar extending around the window perimeter. This collar defines and controls the shape of the film window. When placed on the thermometer, this collar engages a corresponding contact rim on the probe, thus positioning the film window in the proper optical axis for the IR sensor. Furthermore, the collar provides a strain relief capability corresponding to its deformation under load that insures that the window section is held in an "unstretched" condition. The collar location and configuration further acts to maintain the proper optical axis when the thermometer is in use.

In accordance with the varying aspects of the present invention, the disposable cover includes a side wall that is kept relatively thin and thus preferentially deformed relative to the film window when forces are applied to the cover. These forces act on the side wall and impinge on the collar of the film window. Accordingly, the collar structure can follow one of several distinct design approaches, each having the common goal of either eliminating the transfer of forces applied to the cover side wall (isolation), or creating counter forces in reaction to the forces applied to the side wall (strain relief) where these counter forces are of a nature and direction that precludes film stretch. Additionally, the functional collar design acts to deflect the film window away from contact with the ear canal, while enhancing the overall field of view for the sensor.

The foregoing features of the present invention are more fully and readily understood from the following detailed description of specific illustrative embodiments thereof, presented hereinbelow in conjunction with the accompanying drawings of which:

DETAILED DESCRIPTION OF SPECIFIC EMBODIMENTS OF THE INVENTION

Figure 1:
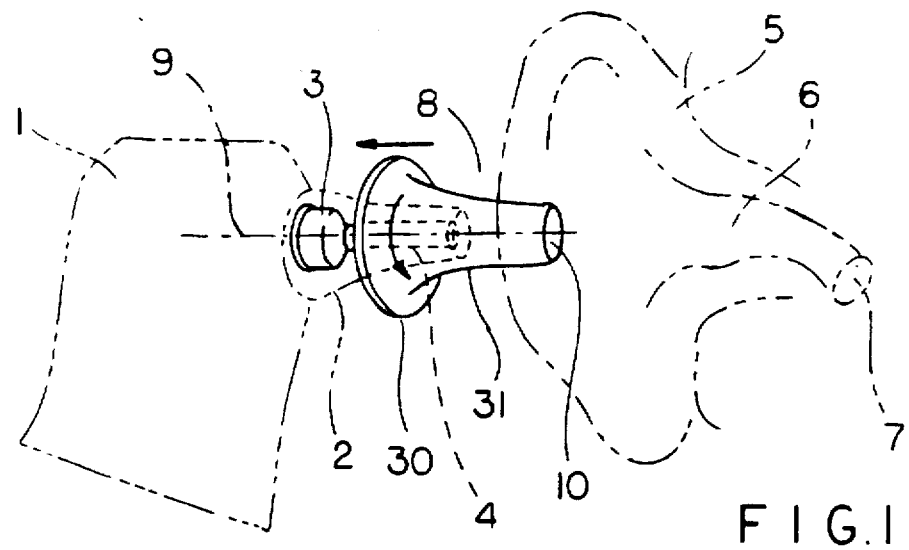
FIG. 1 depicts a probe cover being placed on the probe of an infrared thermometer.

First briefly in overview, the present invention is directed to novel probe cover configurations engineered for enhanced use with clinical thermometers applying infrared temperature detection. The inventive probe cover configuration provides an infrared transparent window that, in its initial, stress-free condition, is optimized for infrared radiation transmission. The window is formed of a highly transmissive polymer material and configured to minimize the potential error sources found in prior art designs.

The inventive probe design is further engineered to prevent subsequent forces from distorting the IR window during use. There are at least two sources of window distortion forces applied to the probe cover. The first distortion force is applied during the probe cover installation onto the thermometer probe tip. As discussed above, the probe cover should be affixed to the probe in a repeatably accurate operation. This attachment process invariably imparts a force to the cover structure. It is, therefore, a feature of the present invention to isolate the IR window portion of the cover from the attachment forces encountered during cover installation.

The second source of distortion forces to the cover arises during a temperature reading. To take a reading, the cover/probe is inserted into the ear canal to create the requisite optical axis between the tympanic membrane of the ear and the IR sensor imbedded in the clinical thermometer. The sliding action of the cover wall against an inner ear canal creates small frictional forces on the cover. Accordingly, it is a second feature of the present invention to isolate the IR transmission window from these frictional forces that may arise during the actual temperature acquisition process.

The force isolation described above is accomplished by use of a collar structure juxtaposed between the side wall of the cover and the film window. In this context, the term "collar" is broadly used to include one or more structural elements that are applied individually or in combination to either isolate the window from wall forces, enhance sensor view, minimize sensor—ear canal contact or create counter forces to negate the translation of wall forces to the film window.

In addition to the foregoing considerations, enhanced cover design is enabled by selective dimensioning of the retention rim of the probe cover relative to the corresponding probe retaining ears. In particular, to prevent vertical movement of the cover relative to the probe, the cover rim or "locking groove" is sized to fit snugly on the retaining ears of the probe by establishing two separate planar points of contact, thus eliminating any "play" that might otherwise permit such freedom of movement. This is accomplished by creating a tight tolerance between the cover locking groove—and its circumferential dimension, and the circumference defined by the outer position of the retaining ears. This alone, however, may cause the cover placement procedure to require an excessive amount of force. The additional force requirement caused by the tighter tolerance accrues from the need to expand the locking groove diameter as the cover is pushed over the retaining ears—an expansion of the elastic hoop. In some instances, especially those that involve a separate cover ejector mechanism, the additional force for attachment of the cover is excessive for its intended purpose. Accordingly, the attachment force is appropriately controlled by enlarging the partial radius of the locking groove. This lowers the angle of the groove lip and allows less force for installation even with the tighter tolerances.

Figure 2:
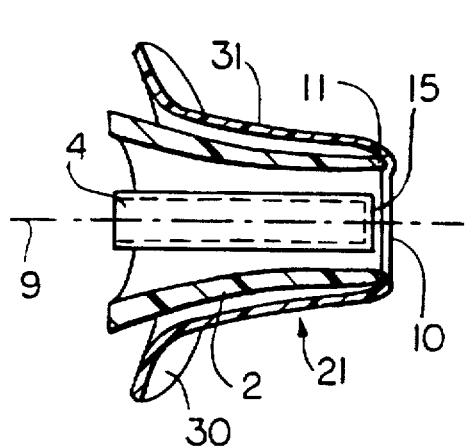
FIG. 2 is a conventional probe cover with a stretched film window portion.

With the foregoing brief overview in mind, attention is first directed to FIGS. 1 and 2 and the general arrangement of the cover—IR thermometer depicted therein. FIG. 1 illustrates the positioning of an infrared probe cover 8 having optical film window 10 as placed over the elongated probe 2 of infrared thermometer 1 (as illustrated by phantom lines). In this instance, probe 2 is appropriately sized for insertion within the ear canal of a human or animal, but also can be used for taking temperature measurements from any other body cavity or surface. Probe 2 houses an infrared sensor 3 and optical wave guide 4 and is able to measure the transmission of thermal radiation from a patient'ear 5, which emanates from the tympanic membrane 7 of ear canal 6. It should be noted that the temperature of the tympanic membrane 7 represents an accurate reading of the interior temperature of a patient'body.

The probe cover 8 is positioned over probe 2 of the thermometer and aligned along optical axis 9 of the probe such that there can be no physical contact between probe 2 and any part of the patient's body, particularly ear canal 6. This insures sanitary operation. As shown in FIG. 1, the probe cover consists of three primary portions: a back end portion 30 for engaging the probe cover with infrared thermometer 1 along probe 2, an intermediate sidewall 31 which extends the length of probe 2, and an optical front end portion, including film window 10 with the requisite optical and thermal properties necessary for the accurate transmission of infrared radiation and, accordingly, to provide an accurate measurement of temperature.

Preferably, the material for the probe cover is a polymer such as polyethylene, polypropylene, or copolymers thereof having a transparency in the spectral range between 3 μm and 15 μm. In general, the material for the probe cover is an inexpensive polymer material that is substantially transparent to infrared radiation. Often the polymer used can be optically enhanced by the addition of clarifying agents in the polymeric matrix. It is not necessary that the sidewall material be the same as the film window. If however, the cover is a unitary structure, the material will be the same for both the side wall and film window. See, e.g., U.S. Pat. No. 5,088,834 to Howe, et al. disclosing a unitary cover configuration for an IR thermometer (the contents of which are incorporated by reference). The cover is preferably a unitary structure formed from a substantially infrared transparent material that is also a sanitary barrier. The preferred manufacturing process is by vacuum forming a plurality of separate covers from a large sheet of thin polypropylene co-polymer. Alternative techniques for manufacturing the cover include other thermoforming techniques and injection molding. If made of separately cast components, the cover components are connected by means of bonding, ultrasonic welding, clamping or adhesive joining. If separate, the cover window material should be highly transmissive to IR radiation when joined or attached to the sidewall.

FIG. 2 provides a cross-section view of a prior art probe cover 21 positioned over probe 2. As shown in FIG. 2, probe 2 has optical axis 9, wave guide 4 with wave guide window 15, and rim 11. When probe cover 21 interfaces with rim 11 of probe 2, stress is applied to the optical film window 10, resulting in a stretching of the film of the optical front end. Also, as shown in the figure, back end portion 30 of cover 21 engages with probe 2 of the infrared thermometer (not shown) and sidewall 31 extends over the length of probe 2. As probe cover 21 is fitted over probe 2, the resulting changes in thickness of the film of the film window 10 due to stretching causes inevitable variations in the optical transmissivity of the front end. Additionally, when stretched, film window 10 may come into contact with the patient, absorbing heat and causing a temperature rise that may alter the temperature reading of the infrared thermometer.

Accordingly, in prior art probe covers of this type, the stretched film window may cause the infrared thermometer to render inaccurate readings.

Figure 3:
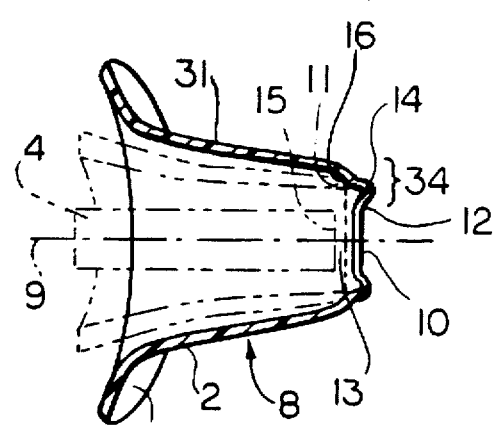
FIG. 3 depicts an improved probe cover with recessed front end.

FIG. 3 illustrates a cross-section view of a probe cover 8, depicting a first embodiment of the present invention, as positioned over probe 2. Film window 10 of the cover forms a recess connected to sidewall 31 via collar 34 comprising a sill 14 with first fold 12 and second fold 16. The depth of the recess is, preferably, in the range from 0.2 mm to 2.0 mm. Sill 14 provides perimeter stiffness to the structure of the probe cover, particularly to the front end portion, in addition to providing a strain relief function for the film window. Sill 14, which may be circular in shape, consists of folded polymer material disposed around the periphery of film window 10. First fold 12 is provided adjacent the recess of the film window 10 and second fold 16 is provided adjacent the sidewall 31.

As shown in FIG. 3, when probe cover 8 is positioned over probe 2 of an infrared thermometer, the cover interfaces with rim 11 of the probe at second fold 16 of sill 14. The probe cover 8 is dimensioned for an interference fit with probe 2 and since rim 11 of probe 2 closely interfaces with cover 8 near second fold 16, the film window 10 is automatically centered along optical axis 9 of probe 2, thus assuring consistent placement of the cover onto the probe. It should be noted that film window 10 is kept separated from wave guide 4 and from wave guide window 15 by air gap 13. Film window 10 is removed from contact with a patient's skin by means of sill 14 and first fold 12, while at the same time, ensuring that a smooth, continuous contact surface area is provided at the front end of the cover, which is essential for patient comfort. In this probe cover arrangement, recessed film window 10 is not subjected to stress when the cover is positioned over probe 2 and is, thus, able to maintain its original shape, as well as its optical properties. In addition, because this probe cover structure removes the film window from contact with a patient's skin, more accurate temperature readings are possible due to the elimination of any secondary radiation. The sill can act as a contact surface between the cover and the probe so that no contact between the probe and the film window is made when the cover is installed on the thermometer.

Figure 4:
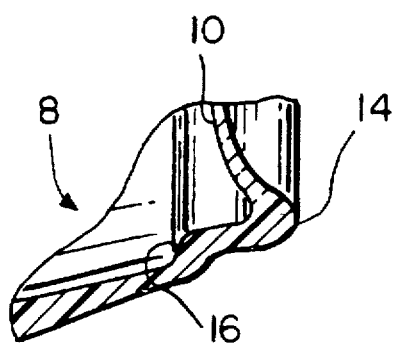
FIG. 4 is an enlarged portion of the front end of the improved probe cover.

FIG. 4 illustrates an exploded cross-section view of a portion of probe cover 8 whereby the thickness of the polymer material of the cover is shown in more detail. As shown in the figure, increased thickness of the sill 14, second fold 16 and/or other portions of the cover may be provided. The collar can comprise a sill of thickness greater than that of either of the film window or the sidewall, with the sill extending around the perimeter of the film window and positioned to interface with a corresponding rim of the probe portion of the thermometer. Increased thickness near sill 14 and/or lower fold 16 may be beneficial for enhancing the strain relief function, as well as ensuring a better engagement by the cover onto the thermometer probe.

Figure 5:
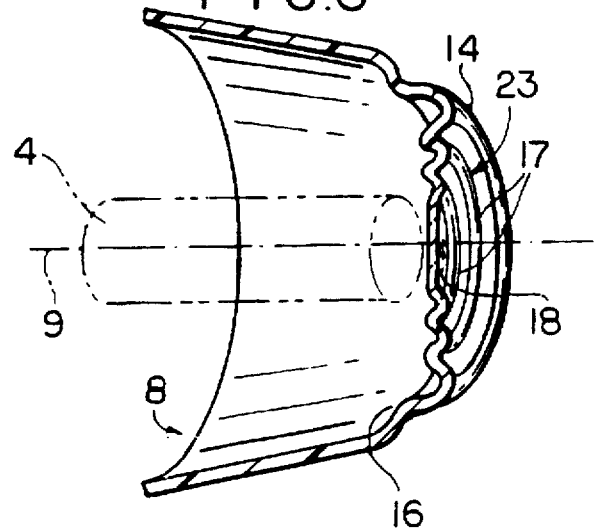
FIG. 5 depicts corrugated optical portion of a probe cover.

FIG. 5 illustrates a cross-section view of an alternative embodiment of the probe cover for the present invention. This embodiment is beneficial for further enhancing strain relief in the front end of the cover. As shown, cover 8 has a corrugated film window 23 with concentrically arranged ridges forming a series of folds 17 and a central flat 18, which represents a non-corrugated area. Preferably, flat 18 should have a diameter comparable with that of wave guide 4. Alternatively, flat 18 may be eliminated so that the corrugated surface extends to optical axis 9. Regardless of whether flat 18 is provided, however, it is desirable to maintain the thickness of folds 17 and flat 18 between 20 µm and 100 µm, otherwise attenuation of the infrared radiation signal and/or absorption of extraneous thermal energy by the cover membrane may result, thereby causing an erroneous temperature reading by the infrared thermometer.

Figure 6:
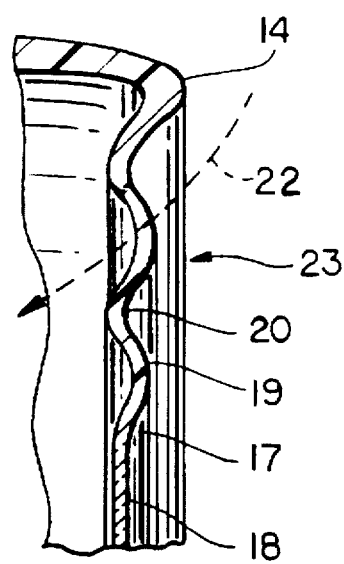
FIG. 6 is an exploded view of the corrugated film at the optical portion of a probe cover.

An enlarged cross-section view of a portion of the cover as referenced in FIG. 5 is illustrated in FIG. 6. The multiple folds 17 of corrugated film window 23 of probe cover 8 provides the additional benefit of increasing the angle of view of the infrared thermometer. As shown, folds 17 may be provided with a varied thickness so that the folds consist of thick portions 20 and thin portions 19. The variations in thickness of the folds provide a lensing effect due to the refractive properties of the polymer material used for the cover. Accordingly, infrared radiation 22 (as shown by the dotted line) which may be directed from a wide angle direction onto the corrugated film window 23 is caused to refract at a more acute angle toward the wave guide due to the varied thickness of folds 17. In a corrugated film window 23 without folds, wide angle infrared radiation 22 is reflected from the flat surface of the cover and, consequently, does not enter the probe.

Figure 7:
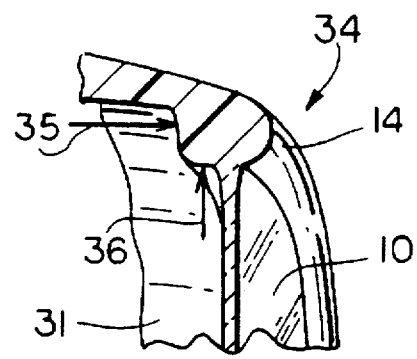
FIG. 7 depicts a probe cover with a collar frame for the film window.
Figure 8:
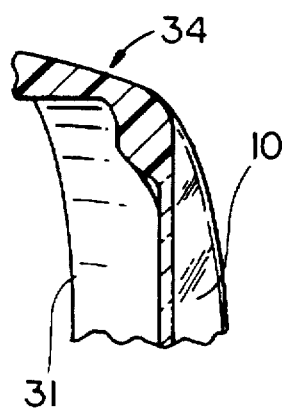
FIG. 8 depicts a variation of the cover shown in FIG. 7.

FIGS. 7 and 8 provide enlarged cross-section views of a portion of the film window 10 of a probe cover in accordance with the present invention. As shown in FIG. 7 and FIG. 8, collar 34 is provided around the film window 10. FIG. 7 illustrates such a probe cover collar with raised sill 14, while FIG. 8 illustrates such a probe cover collar with a flat sill. As shown in both figures, collar 34 provides a semi-rigid frame for the film window 10, thus ensuring that the film window remains free from forces otherwise applied to sidewall 31 and after placement of the cover onto the probe. The rim preferably contacts the collar at a point on the outer perimeter of the first fold. As shown in FIG. 7, care needs to be taken when the probe is positioned inside the cover to ensure that engagement force 35 is applied in a direction as shown in the figure, and not in an incorrect direction 36, which could result, if substantial, in potential stress on the diameter of collar 34 stretching the film window 10.

Figure 9:
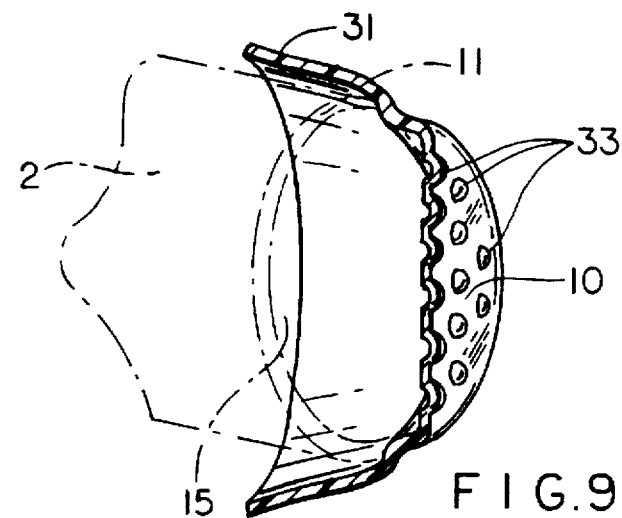
FIG. 9 depicts a cut-out view of a film window with a dimpled surface.

FIG. 9 illustrates a cross-section of another embodiment of a probe cover in accordance with the present invention. This particular embodiment offers an alternative way to relieve the stress susceptible in the film window of the probe cover, while minimizing contact of the cover with a patient's skin. As shown, the cover is positioned over probe 2, with the film window 10 positioned over wave guide window 15 and containing uniformly arranged indentations or dimples 33. These dimples 33 may be either convex or concave. The dimples provide stiffening properties to the front end of the probe cover to avoid stretching that otherwise might occur pursuant to installation/use forces applied to sidewall 31. In addition, the dimples make possible contact with the skin less critical, since the contact area of the front end is reduced. Although FIG. 9 illustrates a probe cover embodiment without a sill, a dimpled probe cover may also be provided having a sill structure (not shown). This choice would depend on the actual design of the infrared thermometer probe used.

Figure 10:
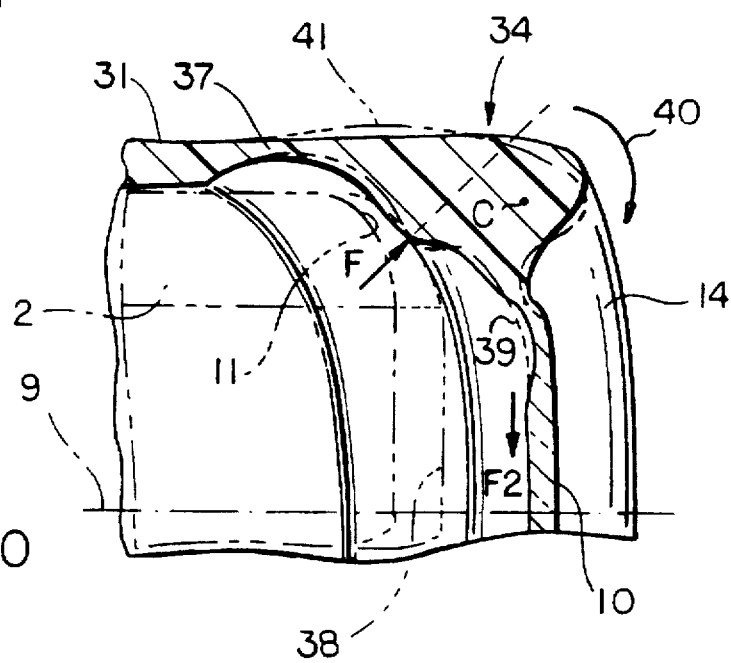
FIG. 10 depicts a probe cover collar structure with variable thickness strain relief.

FIGS. 10–13 illustrate enlarged cross-section views of several variations of a probe cover in accordance with the present invention having collar structure that includes a collapsible sill 14. In this design, forces for installing or using the cover on sidewall 31 create compensating forces in collar 34 that prevent film window stretch, and, in fact, cause the film window to collapse. For example , the second fold is flattened upon application of a force to the first fold, and the film window then becomes slightly collapsed upon the flattening of the second fold. For example, FIG. 10 illustrates a probe cover having a membrane of varied thickness whereby strain relief collar 34 is provided adjacent to thin wall 37, which is connected to sidewall 31. As shown in the figure, when the cover is positioned over probe 2, rim 11 of the probe engages with collar 34, as illustrated by phantom lines 38. Due to the rigidity of collar 34, the forces resulting from the interface of rim 11 of the probe with the cover, as shown by engaging force F, causes thin wall 37 to preferentially stretch, thus collapsing collar 34 in direction 40, thereby resulting in centripetal force F2. In addition, because the fulcrum point of collar 34, as shown by point c, is located outside the direction of engaging force F, a torsion momentum is created within collar 34, causing a portion of the collar to move inward into position 39, as indicated in the figure. As a result of collar 34 in conjunction with thin wall 37, sill 14 collapses toward optical axis 9 upon engagement of the cover with probe 2. This insures a stretch-free film window.

Figure 11:
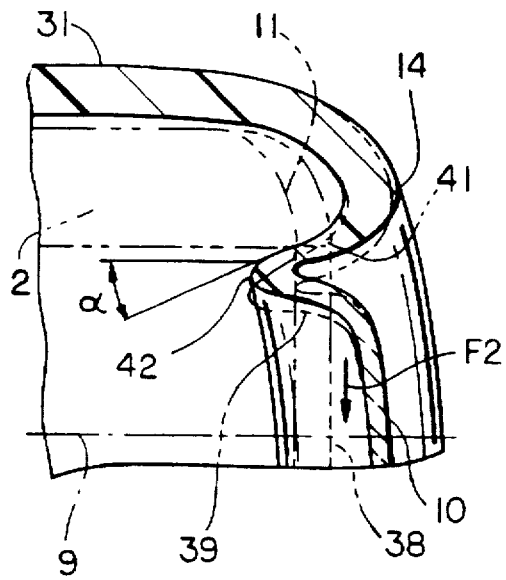
FIGS. 11 and 11A depict a probe cover collar structures with collapsing strain relief.

As indicated, FIG. 11 illustrates another embodiment of a probe cover having collapsing sill 14. The cover is positioned over probe 2 and engaged with rim 11. Collar 34 comprises engagement fold 42 and fold angle a in relation to optical axis 9. As shown in the figure, the probe 2 engages with the cover at a position 41 which causes rim 11 to move fold angle 42 into position 39, as indicated by the labelled thin line. As a result, centripetal force F2 is created and sill 14 is collapsed toward optical axis 9, thus preventing film window 10 from being stretched. Experience indicates that the smaller the fold angle a, the greater the centripetal force F2.

Figure 11A:
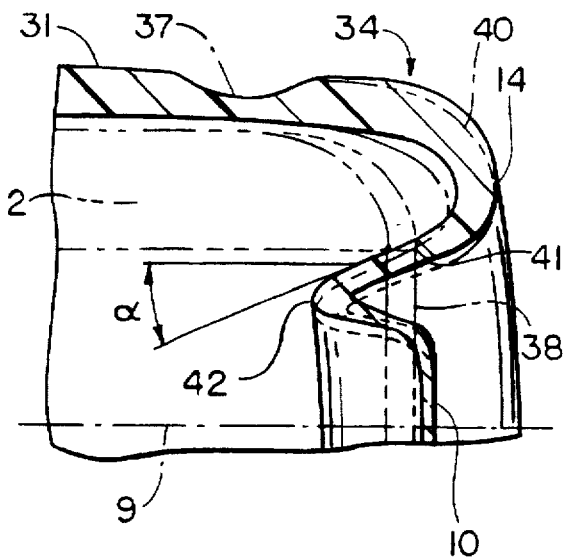

FIG. 11A illustrates a probe cover based on FIG. 11 and having thin wall 37 adjacent to sill 14. It should be noted that angle a, which is defined by rim 11 at engagement point 41 and fold 42, results in an evident clockwise collapsing of the sill 14 in direction 40, as indicated by the clockwise arrow, thus, preventing film window 10 from being stretched. Similar to the embodiment of FIG. 11, the smaller the fold angle (a), the greater the centripetal force that results when the cover is positioned onto the probe.

Figure 12:
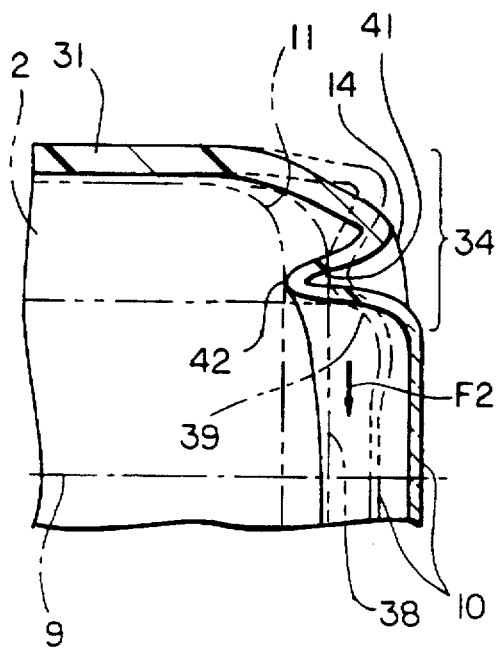
FIG. 12 is another embodiment depicting collapsing strain relief.

Continuing, FIG. 12 illustrates another embodiment of a probe cover having a collapsing sill. As shown in FIG. 12, when the probe is placed into the cover, engagement fold 42 of collar 34 is engaged with rim 11 of the probe at engagement point 41. This engagement causes fold 42 to unfold, creating centrifugal force F1 outward from sill 14 and centripetal force F2 in the film window in a direction towards optical axis 9. As shown in the figure, the engagement position of probe 2 is indicated by phantom line 38 and fold 42 is moved into position 39, as indicated by the labelled thin line. Accordingly, with this embodiment, the unfolding of fold 42 relieves any tension in film window 10 and precludes stretching.

Figure 13:
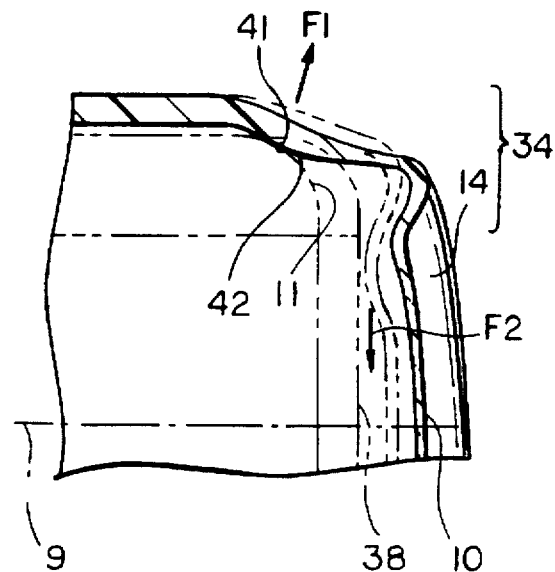
FIG. 13 provides a variation of the improved probe cover of FIG. 12.

Turning now to FIG. 13, a probe cover design is depicted that corresponds closely to that of FIG. 12, but engagement fold 42 is placed outside of sill 14 and makes contact on the periphery of rim 11, causing film window 10 to collapse as depicted by the ghost lines. The structure requires smaller curvature of fold 42 which may simplify the manufacturing process.

Figure 14B:
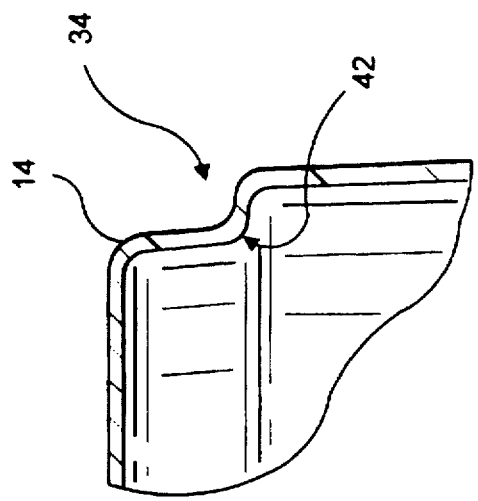
FIGS. 14A and 14B depict a further cross-sectional diagram of an inventive cover in accordance with the present invention and an enlarged view of its collar structure also in cross-section; and For convenience of reference, like components, elements and features in the various figures are designated by the same reference numerals or characters.
Figure 14A:
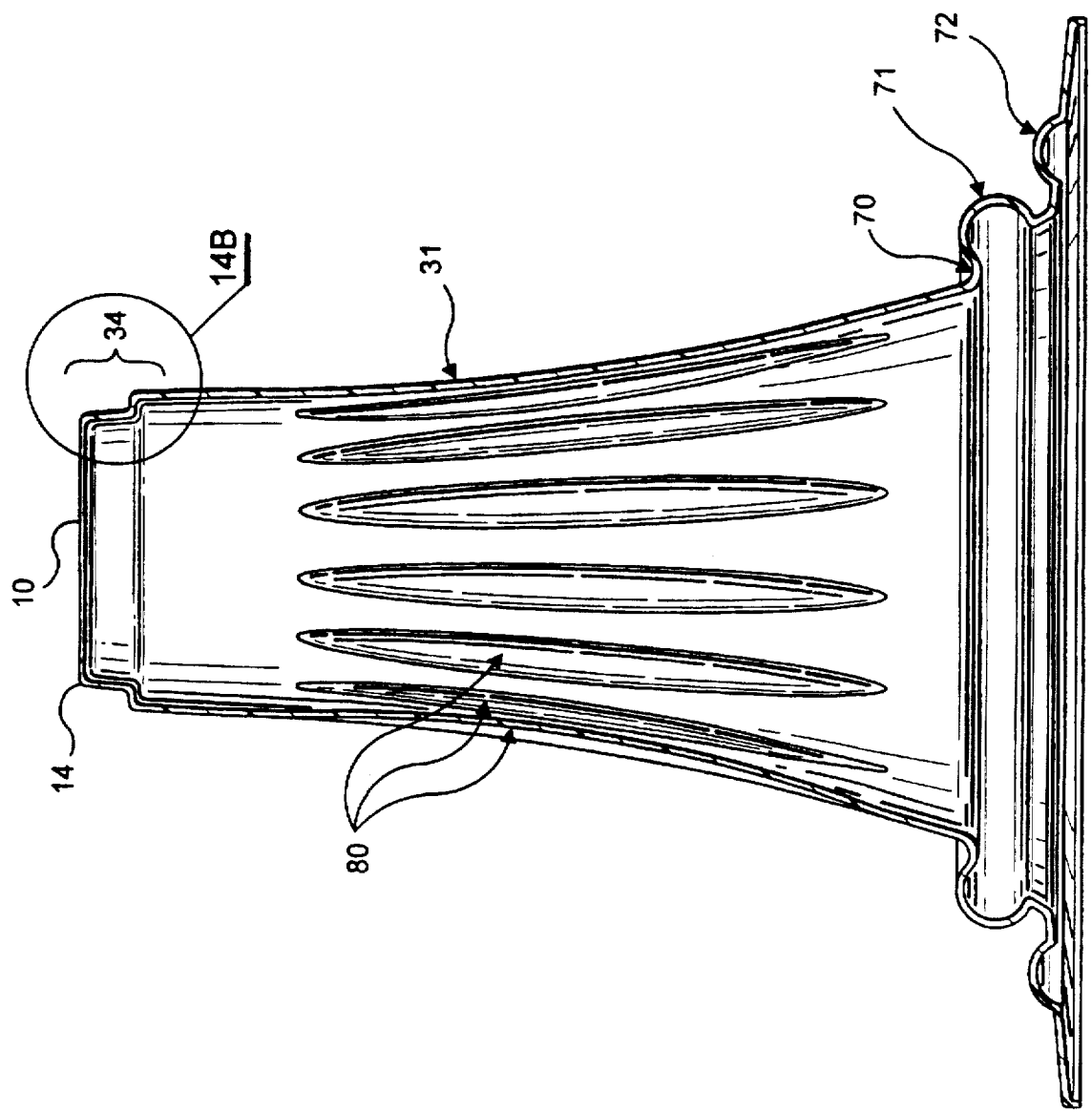

Finally, the general probe cover design of FIG. 13 is depicted in FIG. 14A, with an enlargement of collar 34 shown in FIG. 14B. As can be seen, collar 34 comprises fold 42 and sill 14 linking film window 10 to sidewall 31. The sidewall 31 further comprises longitudinal ridges 80 for increasing wall stiffness and permitting the use of a thinner and more elastic sidewall 31. Curves 70–72 are anchor points for attachment onto the IR probe (not shown).

It should be noted that in the embodiments shown in FIGS. 10–13, any centrifugal forces which could possibly be created in the front end portion when the cover is positioned over the probe would be converted to centripetal forces in a direction towards the optical axis of the probe, thus providing strain relief in the film window. It should also be pointed out that the various approaches depicted in the individual figures can be combined as dictated by the particular design needs.

Although the invention has been described in detail for the purpose of illustration, it is to be understood that such detail is solely for that purpose and that variations can be made therein by those skilled in the art without departing from the spirit and scope of the invention.

What is claimed is:

1. A cover for use with an infrared thermometer to provide a sanitary barrier between said thermometer and a patient, said cover comprising:
   an infrared transparent film window;
   a hollow tubular sidewall having means for attaching said cover to said thermometer wherein said sidewall is configured to provide a repeatably consistent placement of said film window when attached to said thermometer so as to establish optical alignment with said window and an infrared sensor within said thermometer; and
   a collar linking said film window and said sidewall wherein said collar receives forces applied to said sidewall and acts to prevent the translation of these forces from said sidewall into a stretching force applied against said film window.

2. The cover of claim 1 wherein said collar, film window and sidewall are a unitary structure and said collar extends around a perimeter of said film window forming a complete seal between the sidewall and film window.

3. The cover of claim 2 wherein said collar comprises a sill of thickness greater than that of either of the film window and sidewall, wherein the sill extends around the perimeter of said film window and is positioned to interface with a corresponding rim of a probe portion of said thermometer.

4. The cover of claim 3 wherein said sill provides a substantially rigid frame for said film window to isolate said film window from forces that may be applied to said sidewall.

5. The cover of claim 4 wherein said sill acts as a contact surface between said cover and said probe whereby no contact between said probe and said film window is made when the cover is installed on the thermometer.

6. The cover of claim 3 made of an inexpensive polymer material that is substantially transparent to infrared radiation.

7. The cover of claim 3 wherein said sidewall is, stretchable relative to said sill and includes a plurality of stiffness enhancing longitudinal ridges.

8. The cover of claim 3 wherein said film window includes preformed surface characteristics that act to enhance window rigidity.

9. The cover of claim 8 wherein said surface characteristics include a plurality of uniformly distributed dimples.

10. The cover of claim 8 wherein said surface characteristics include a series of concentric ridges.

11. The cover of claim 8 wherein said surface characteristics increase an effective field of view for the probe.

12. The cover of claim 3 wherein said film window is recessed from the sill of said cover.

13. A cover for use with an infrared thermometer to protect the forward probe of said thermometer from contaminating substances and provide for the assessment of temperature with minimal error, said cover comprising:

a film window that is substantially transparent to radiation in the far infrared region of the spectrum;

a hollow sidewall portion shaped and configured to fit over the thermometer probe wherein said sidewall further provides a means for engaging said probe and thereby retaining said cover in a position on said probe that provides an optical link between said film window and an infrared sensor in said thermometer; and a collar structure comprising at least one fold for linking said sidewall to the perimeter of said film window, wherein said at least one fold exhibits a strain relief action when a force is applied to said sidewall that precludes a corresponding stretching force from acting to stretch the film window.

14. The cover of claim 13 wherein said film window further comprises a plurality of pre-formed surface characteristics.

15. The cover of claim 14 wherein said surface characteristics are arranged and configured to provide additional rigidity to said film window.

16. The cover of claim 14 wherein said surface characteristics are arranged and configured to enhance the field of view of said probe.

17. The cover of claim 13 wherein said collar comprises a sill extending around the perimeter of said film window, a first fold for interfacing a rim on said probe and a second fold linking the collar to the film window.

18. The cover of claim 17 wherein said second fold is flattened upon application of a force on said first fold, with the film window becoming slightly collapsed upon said flattening of said second fold.

19. The cover of claim 17 wherein said rim contacts said collar at a point on the outer perimeter of said first fold.

20. The cover of claim 17 wherein said film window is slightly recessed from the top of said sill.

21. A process for assessing temperature by measuring infrared radiation in a sanitary manner, said process comprising the steps of:

placing a cover over a probe of an infrared thermometer;

placing said probe and cover assembly into a patient's ear canal;

exposing a sensor in said thermometer to infrared radiation from a tympanic membrane within said ear canal;

converting said sensed infrared radiation into a value corresponding to the temperature of said membrane;

wherein said cove comprises a sidewall and a film window linked together by a collar structure and said collar structure provides means to prevent forces applied to said sidewall from adversely distorting or stretching said film window.

22. The process of claim 21 wherein said cover is a unitary structure formed from a substantially infrared transparent material that is also a sanitary barrier.

23. The process of claim 21 wherein said sidewall is structured and configured to fit over said probe and includes a plurality of longitudinal ridges to enhance structural rigidity of said sidewall.

24. The process of claim 21 wherein said collar structure comprises a sill for isolating said film window from forces applied to said sidewall.

25. The process of claim 21 wherein said collar structure comprises a first and a second fold wherein said first fold contacts a rim on said probe and said second fold flattens out pursuant to forces applied to said first fold.

* * * * *